United States Patent [19]

Larson

[11] Patent Number: 5,029,671
[45] Date of Patent: Jul. 9, 1991

[54] MECHANIC'S WALK

[76] Inventor: Robert L. Larson, P.O. Box 303, Madison Lake, Minn. 56063

[21] Appl. No.: 569,844

[22] Filed: Aug. 20, 1990

[51] Int. Cl.⁵ .......................... B27B 21/00; B25H 1/06
[52] U.S. Cl. .................................... 182/155; 182/184; 182/131; 182/223
[58] Field of Search ............... 182/223, 152, 153, 155, 182/184, 131

[56] References Cited

U.S. PATENT DOCUMENTS

| 789,650 | 5/1905 | Berg et al. | 182/131 |
| 2,872,252 | 2/1959 | Konkle | 182/15 |
| 2,957,541 | 10/1960 | Everest | 182/115 |
| 3,265,156 | 8/1966 | Jacobs | 182/223 |
| 3,976,163 | 8/1976 | Watkinson | 182/152 |
| 4,919,230 | 4/1990 | Langer | 182/223 |

Primary Examiner—Reinaldo P. Machado
Attorney, Agent, or Firm—Burd, Bartz & Gutenkauf

[57] ABSTRACT

A compact foldable mechanic's walk for facilitating servicing of motor vehicles by improving access to the engine compartment. The mechanic's walk includes a pair of relatively narrow elongated planar mirror image platform members hingedly connected together along abuttable acute angular ends. The platform members are supportable by a plurality of pivotally supported legs adapted to be folded in against the bottom surfaces of the platform members. The platform members preferably are flanged so that in folded condition the in-folded support legs are enclosed within a box-like enclosure.

16 Claims, 2 Drawing Sheets

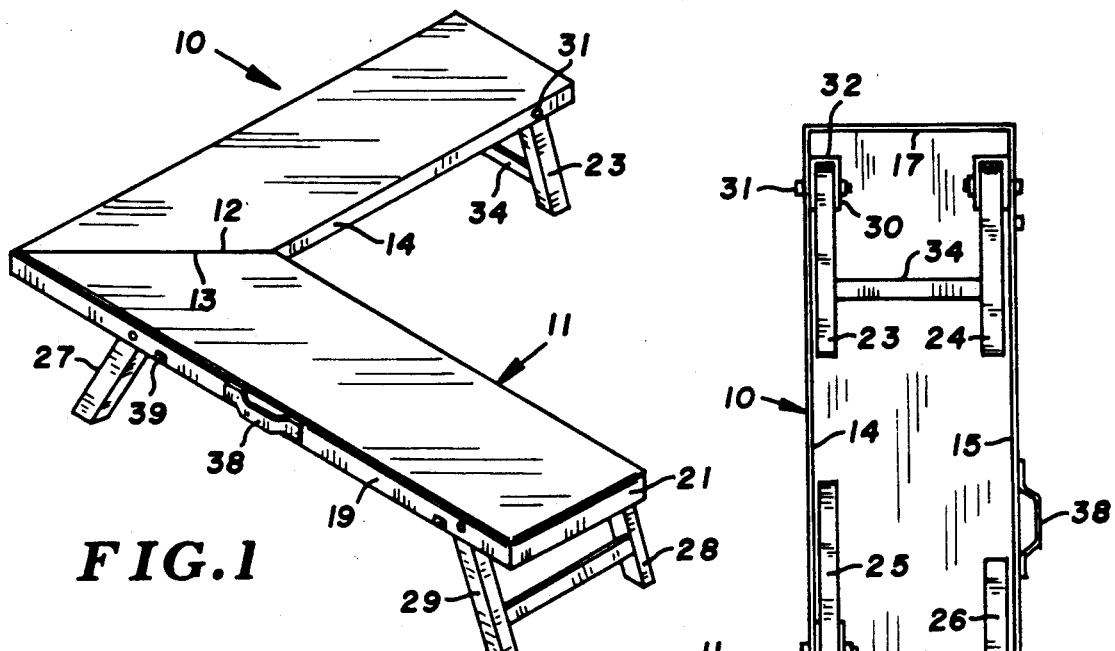
FIG.1
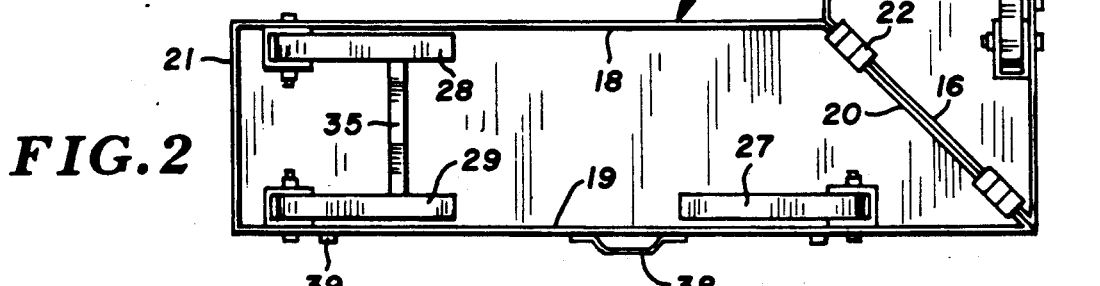
FIG.2
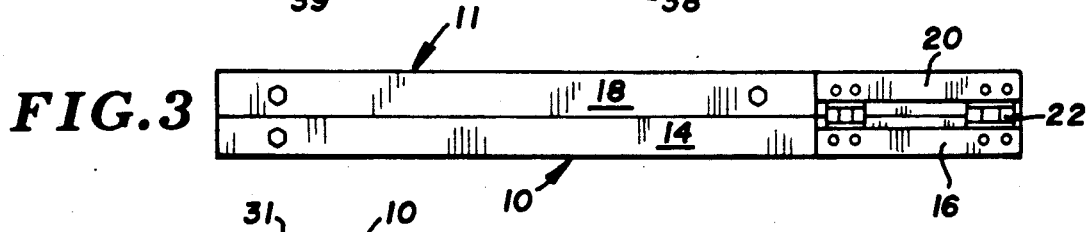
FIG.3
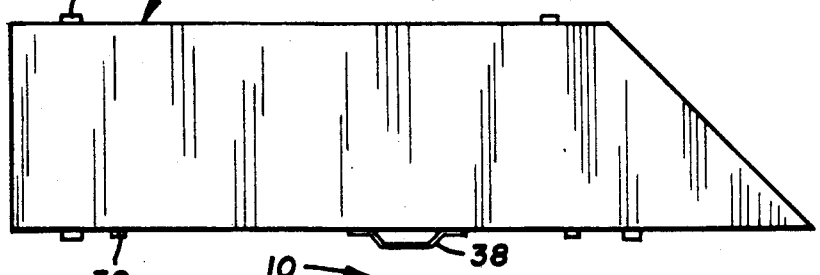
FIG.4
FIG.5

MECHANIC'S WALK

BACKGROUND OF THE INVENTION

1. FIELD OF THE INVENTION

This invention relates to an elevated mechanic's walk or platform for facilitating the servicing of motor vehicles. Many motor vehicles, such as trucks and buses, have engines which are mounted relatively high above the road surface and whose hood granting access to the engine and accessory components make normal access difficult for a person of average height standing on the ground or garage floor. This invention alleviates that problem. More especially the invention relates to a two-part foldable multi-legged walk or platform for extending along one side and end of a vehicle for use by mechanics while working in the engine compartment.

2. THE PRIOR ART

Konkle U.S. Pat. No. 2,872,252 and Everest U.S. Pat. No. 2,957,541 are exemplary of the prior art. Both patents show devices intended for the same general purpose but having structure totally different from that of the present invention.

SUMMARY OF THE INVENTION

Broadly stated, the foldable mechanic's walk of the present invention comprises a pair of relatively narrow elongated planar platform members, each having a top and bottom surface, and each having one acutely angular end edge, the acute angles being equal and the platform members being abuttable along the angular edges. The platform members are connected by hinge means along the angular edges. A plurality of support legs are foldably attached to extend from the bottom surface of each of the platform members to raise the top surface of the platform members high enough off the ground level to permit access by a mechanic to the engine compartment of a vehicle.

BRIEF DESCRIPTION OF THE DRAWINGS

The invention is illustrated in the accompanying drawings in which corresponding parts are identified by the same numerals and in which:

FIG. 1 is a perspective view of the mechanic's walk in open position with its legs extended;

FIG. 2 is a bottom plan view of the mechanic's walk;

FIG. 3 is a side elevation of the mechanic's walk in folded configuration;

FIG. 4 is a plan view of one of the platform members;

FIG. 5 is a fragmentary side view, partly in section, showing the mounting of one foldable leg;

DETAILED DESCRIPTION OF THE PREFERRED EMBODIMENT

Figure 6:
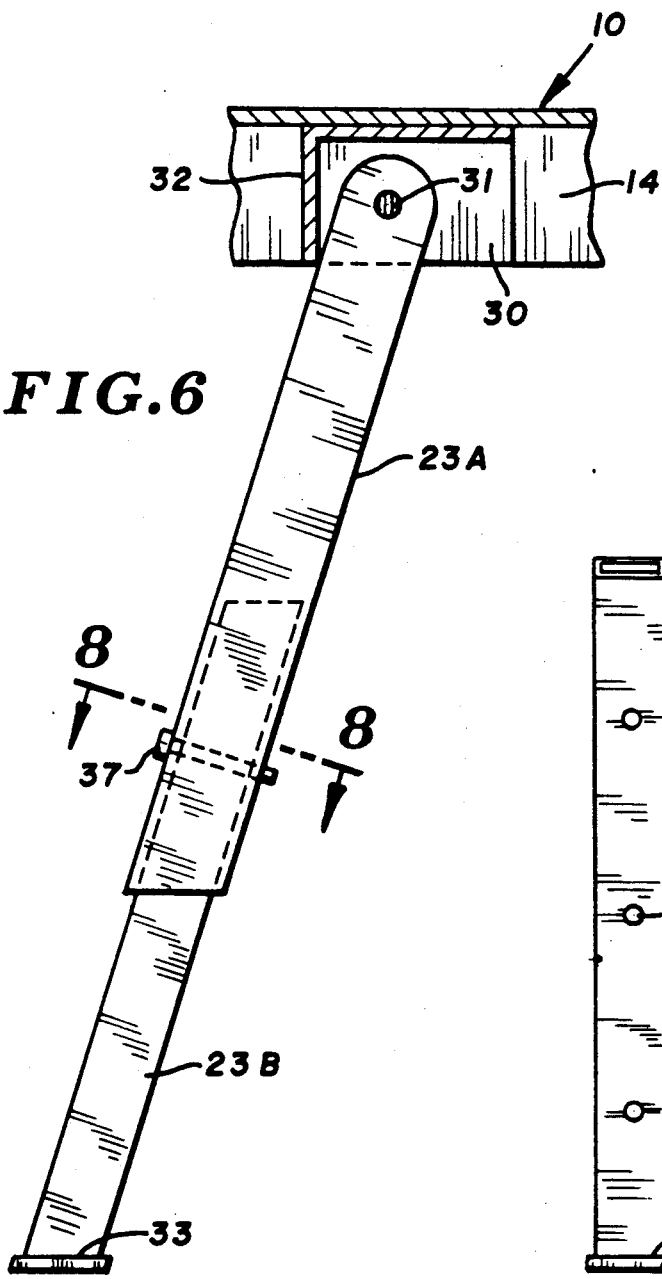
FIG. 6 is a similar view on a somewhat enlarged scale of an alternative form of adjustable length leg.

Referring now to the drawings, the mechanic's walk according to the present invention is shown in open configuration in FIG. 1. The mechanic's walk comprises a pair of mirror image elongated planar plank-like platform members 10 and 11. Each of the platform members has an acutely angular end edge 12 and 13 respectively along which the platform members abut. Preferably the angular edges 12 and 13 are disposed at 45 degree angles so that the platform members of the assembled walk are disposed at right angles to one another. The walk may thus be placed adjacent one end and side of a vehicle for easy access to the engine compartment. Then, if necessary, it can readily be moved to the opposite side of the same end of the vehicle.

The platform members are narrow relative to their length. Typically they may be about 9" to 15" wide, and preferably about 12". They may be about 3' to 5' long on their longer outside edges, and they are preferably of equal length.

The platform members desireably have downwardly extending flanges 14–21 on the opposite side edges and angular ends, and preferably on the opposite flat ends. One or more hinges 22 are secured to the angular flanges 16 and 20 such that when one or the other of platform members 10 or 11 is rotated on the axis of rotation of the hinge or hinges, one of the platform members may be folded back upon the other. When this is done the edges of the corresponding flanges of the platform members 14 and 18, 15 and 19, etc. abut one another to form a closed box-like structure in which the supporting legs may be concealed when the mechanic's walk is not in use.

The mechanic's walk is supported by a plurality of legs 23–29. Each of the legs is of similar structure, preferably formed of tubular metal of square or other rectangular cross-section. With particular reference to supporting leg 23, each leg is supported from the bottom surface of the platform member, being pivotally supported in a box-like bracket 30 welded or otherwise rigidly secured to the underside of the platform member. One end of the leg is pivotally supported within the bracket 30 by means of a bolt 31 or equivalent means. For maximum stability the legs are preferably mounted so that in folded-out position they are slightly splayed, extending angularly outwardly toward the ends of the platform members. Each bracket 30 has an end plate 32 which functions as a stop means against which the upper end of the leg rests to maintain the splayed orientation of the leg. Each leg is of such dimension that when the legs are folded in against the bottom surface of the platform members they are wholly within the adjacent flanges so as not to interfere with folding of the walk. Typically the flanges are about 1 ½" to 2" wide and the legs are sized correspondingly. Preferably each leg is provided with a foot pad 33 which may be metal or a tough rubber or synthetic rubber-like material. The foldable legs are located to provide maximum support for the mechanic's walk. Pairs of legs 23 and 24, and 28 and 29 are mounted adjacent the free ends of the platform members and preferably are connected by crossbars 34 and 35, respectively, to permit these pairs of legs to be folded in and out together. Individual legs 25–27 are mounted adjacent the abutting angular edges of the platform members to provide support for the corner formed by the abutting platform members.

Figure 8:
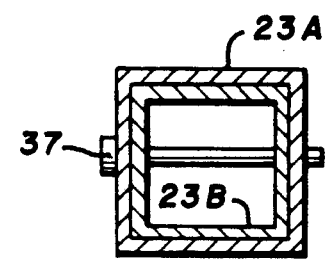
FIG. 8 is a sectional view on a somewhat further enlarged scale on the line 8—8 of FIG. 6.
Figure 7:
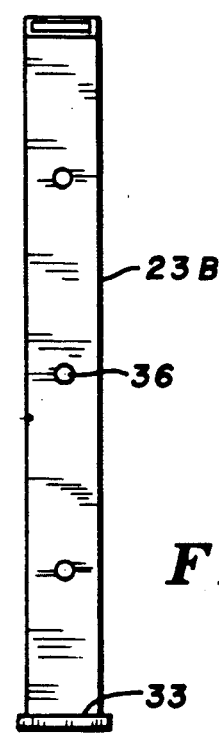
FIG. 7 is an elevational view of the inner telescopic member of the adjustable leg.

Referring to FIGS. 6 through 8, there is shown an alternative adjustable-length support leg which, apart from its adjustable length, is similar to those support legs already described. The support leg is composed of tubular telescopic members 23A and 23B which fit with a close slide fit to permit telescoping movement without wobbliness. The telescopic leg members are provided with sets of holes 36 through their opposite side walls. Multiple sets of spaced apart holes are preferably provided in at least one of the leg members to permit several different leg lengths. A pin 37 extends through aligned holes in both leg segments to hold the segments together at the selected length.

To facilitate carrying, shipping, storage, and assembly and disassembly of the mechanic's walk, the component parts should be formed from strong but lightweight materials. The platform members, for example, may be formed from lightweight metal planking such as aluminum or magnesium. Lightweight steel members may be made utilizing expanded metal or mesh construction, or perforated sheet material, both for lesser weight and greater traction. Carrying handles 38 are desireably provided to facilitate carrying of the closed compact walk. Conventional snap fasteners 39 are preferably provided to hold the platform members together in folded configuration.

It is apparent that many modifications and variations of this invention as hereinbefore set forth may be made by those skilled in the art without departing from the spirit and scope thereof. The specific embodiments described are given by way of example only and the invention is limited only by the terms of the appended claims.

I claim:

1. A mechanic's walk for facilitating the servicing of motor vehicles which comprises:
   (A) a pair of relatively narrow elongated planar platform members, each having a top and bottom surface and each having one acutely angular end edge, said acute angles being equal and said platform members being abuttable along said angular edges,
   (B) hinge means connecting said platform members along said angular edges, and
   (C) a plurality of support legs foldably attached to extend from the bottom surface of each of said platform members.

2. A mechanic's walk according to claim 1 wherein said angular edges are disposed at 45° angles.

3. A mechanic's walk according to claim 1 wherein said foldable support legs are adjustable in length.

4. A mechanic's walk according to claim 3 wherein said adjustable length legs each comprise:
   (A) a first tubular member pivotally attached to a platform member adjacent one end thereof,
   (B) a second element telescopically fitted within said first element, and
   (C) fastening means for securing said second element in fixed longitudinal relation to said first element.

5. A mechanic's walk according to claim 4 wherein:
   (A) said first and second elements are of square tubular construction,
   (B) one of said leg elements has a plurality of spaced apart sets of holes extending through one pair of opposite side walls,
   (C) the other of said leg elements has at least one set of holes extending through one pair of opposite side walls, and
   (D) a bolt or pin extends through one set of holes in each of the leg elements.

6. A mechanic's walk according to claim 1 wherein said support legs in folded-in position lie adjacent to the bottom surfaces of the platform members and in folded-out position extend angularly downward and outwardly from adjacent the ends of the platform members.

7. A mechanic's walk according to claim 6 wherein said support legs at the outermost ends of the platform members are disposed in pairs, each pair connected by a cross-bar for movement together.

8. A mechanic's walk according to claim 1 wherein said platform members are formed from lightweight metal planking.

9. A mechanic's walk according to claim 8 wherein said platform members have downwardly extending flanges on at least the opposite side edges and angular end edges.

10. A mechanic's walk according to claim 9 wherein said support legs are pivotally attached to said flanges and foldable against the bottom surfaces of the platform members within the space between the flanges.

11. A mechanic's walk for facilitating the servicing of motor vehicles which comprises:
    (A) a pair of relatively narrow elongated planar platform members formed from lightweight metal planking, each of said platform members having a top and bottom surface and each having a 45° angle end edge, said platform members being abuttable along said angular edges,
    (B) hinge means connecting said platform members along said angular edges, and
    (C) a plurality of support legs foldably attached to extend from the bottom surface of each of said platform members.

12. A mechanic's walk according to claim 11 wherein:
    (A) said platform members have downwardly extending flanges on at least the opposite side edges and angular end edges, and
    (B) said support legs are pivotally attached to said flanges and foldable against the bottom surfaces of the platform members within the space between the flanges.

13. A mechanic's walk according to claim 12 wherein said foldable support legs are adjustable in length and each comprise:
    (A) a first tubular element pivotally attached to a platform member adjacent one end thereof,
    (B) a second element telescopically fitted within said first element, and
    (C) fastening means for securing said second element in fixed longitudinal relation to said first element.

14. A mechanic's walk according to claim 13 wherein:
    (A) said first and second leg elements are of square tubular construction,
    (B) one of said leg elements has a plurality of spaced apart sets of holes extending through one pair of opposite side walls,
    (C) the other of said leg elements has at least one set of holes extending through one pair of opposite side walls, and
    (D) a bolt or pin extends through one set of holes in each of the leg elements.

15. A mechanic's walk according to claim 12 wherein said support legs in folded-in position lie adjacent to the bottom surfaces of the platform members and in folded-out position extend angularly downward and outwardly from adjacent the ends of the platform members.

16. A mechanic's walk according to claim 15 wherein said support legs at the outermost ends of the platform members are disposed in pairs, each pair connected by a cross-bar for movement together.

* * * * *